(12) United States Patent
Dragic

(10) Patent No.: US 7,006,752 B2
(45) Date of Patent: Feb. 28, 2006

(54) CODOPED AL-YB WAVEGUIDE AND METHOD OF MANUFACTURING SAME

(76) Inventor: Peter Dragic, 4631 N. Melden, #2N, Urbana, IL (US) 60640

( * ) Notice: Subject to any disclaimer, the term of this patent is extended or adjusted under 35 U.S.C. 154(b) by 85 days.

(21) Appl. No.: 10/806,931

(22) Filed: Mar. 23, 2004

(65) Prior Publication Data

US 2005/0213908 A1   Sep. 29, 2005

(51) Int. Cl.
G02B 6/00 (2006.01)
G02B 6/02 (2006.01)
G02B 6/16 (2006.01)
G02B 6/10 (2006.01)

(52) U.S. Cl. ............... 385/142; 385/141; 385/123; 385/126; 385/127; 385/128; 385/129; 385/131

(58) Field of Classification Search ........... 385/123, 385/126–128, 131, 141, 142
See application file for complete search history.

(56) References Cited

U.S. PATENT DOCUMENTS

| | | | |
|---|---|---|---|
| 4,913,521 A * | 4/1990 | Tajima et al. ............ | 385/126 |
| 6,587,623 B1 | 7/2003 | Papen et al. | |
| 2002/0012378 A1 * | 1/2002 | Zenteno ................. | 372/108 |
| 2004/0028101 A1 * | 2/2004 | Byren et al. ............ | 372/39 |

* cited by examiner

*Primary Examiner*—Brian Healy
*Assistant Examiner*—Charlie Peng
(74) *Attorney, Agent, or Firm*—Watson IP Group; Jovan N. Jovanovic

(57) ABSTRACT

A waveguide configuration comprising a core, at least one cladding and a buffer. The core includes Al and Yb. The respective amount Yb in the divalent state is such that any indirect and direct losses of Yb in the divalent state are exceeded by the gain attributable to Yb in the trivalent state. The at least one cladding extends about the core. The at least one buffer extends about the outermost of the at least one cladding.

11 Claims, 3 Drawing Sheets

CODOPED AL-YB WAVEGUIDE AND METHOD OF MANUFACTURING SAME

BACKGROUND OF THE INVENTION

1. Field of the Invention

The present invention relates in general to waveguides, and more particularly, to codoped Al—Yb waveguides. The waveguide of the present invention includes trivalent Yb within the waveguide and is substantially free of divalent Yb therewithin. A method is presented which minimizes the formation of divalent Yb within the waveguide.

2. Background Art

The use of waveguides in various industries such as telecommunications and lasers, among others, has been steadily increasing. The ability to send optical signals through waveguides is well known in the art, and, a number of different constructions have been developed.

One type of construction calls for the codoping of a waveguide with Aluminum and Ytterbium. While such waveguides exhibit beneficial characteristics and have many benefits, problems have been encountered. For example, a very effective SBS suppressing fiber includes a core which includes Al—Yb codoping. Among other problems, the codoped fibers often exhibit emissions and/or absorption at improper and undesirable wavelengths. For example, one manufactured SBS suppression fiber has exhibited absorption in the 1064 nm range. Other waveguides which include codoped Al—Yb have exhibited photodarkening effects, which degrade the waveguide over time, and which eventually render the waveguide useless.

Accordingly, it is an object of the invention to overcome the deficiencies encountered with prior art codoped Al—Yb waveguides.

It is another object of the present invention to provide a codoped Al—Yb waveguide which is free of photodarkening effects over time.

It is another object of the present invention to provide a codoped Al—Yb waveguide usable as an SBS suppression waveguide for lasers and telecommunication.

It is another object of the invention to provide a method of manufacturing codoped Al—Yb waveguide which does not include the deficiencies and performance inhibiting properties of prior art waveguides.

These objects as well as other objects of the present invention will become apparent in light of the present specification, claims, and drawings.

SUMMARY OF THE INVENTION

The invention comprises a waveguide configuration comprising a core, a first cladding, a second cladding, a third cladding and a buffer. The core has an index of refraction and a shear velocity. The core is doped with Al, Yb, wherein the respective amount Yb in the divalent state is such that any indirect and direct losses of Yb in the divalent state are exceeded by the gain attributable to Yb in the trivalent state. The first cladding extends about the core having a shear velocity which is less than that of the core and an index of refraction which is less than the core. The second cladding extends about the first cladding. The second cladding includes a shear velocity which is greater than that of the first cladding. An optical mode has an index of refraction greater than that of the second cladding. The third cladding extends about the second cladding. The third cladding has an index of refraction less than that of each of the core, first cladding and second cladding. The buffer extends about the third cladding.

In a preferred embodiment, the core includes at least one mitigating agent in place of at least some Al. In one such embodiment, the mitigating agent comprises at least one of the group selected consisting of: Boron, Fluorine, Phosphorous, and Germanium.

In another preferred embodiment, the indirect and direct losses of Yb in the divalent state are exceeded by the gain attributable to Yb in the trivalent state by a factor of at least two. Preferably, the factor is at least six.

In another preferred embodiment, the core is substantially free of divalent Yb.

In another aspect of the invention, the invention comprises a waveguide configuration. The waveguide configuration comprises a core, at least one cladding and a buffer. The core includes Al and Yb. The respective amount Yb in the divalent state is such that any indirect and direct losses of Yb in the divalent state are exceeded by the gain attributable to Yb in the trivalent state. The at least one cladding extends about the core. The buffer extends about the outermost of the at least one cladding.

In one such preferred embodiment, wherein the core includes at least one mitigating agent in place of at least some Al. In one such preferred embodiment, the mitigating agent comprises at least one of the group consisting of: Boron, Fluorine, Phosphorous and Germanium.

In another preferred embodiment, the at least one cladding comprises a first cladding and a second cladding.

In another such preferred embodiment, the Yb within the core is substantially entirely trivalent Yb.

In another aspect of the invention, the invention comprises a method for minimizing the formation of divalent Yb within a waveguide comprising the steps of: providing a waveguide; doping the core with Al; doping the core with Yb; and minimizing the formation of divalent Yb.

In a preferred embodiment, the step of minimizing the formation of divalent Yb comprises the step of: doping the core with a mitigating agent.

In another preferred embodiment, the mitigating element comprises at least one of the group consisting of Boron, Fluorine, Phosphorous and Germanium.

In another preferred embodiment, the step of controlling the formation of divalent Yb comprises the step of preclusion of the formation of YbAl clusters within the core.

Preferably, the the step of preclusion of formation of YbAl clusters within the core comprises the maintaining of Yb and Al below the relative concentration levels wherein Al—Yb precipitates during cooling.

In another preferred embodiment, the step of minimizing comprises the step of minimizing the formation of divalent Yb such that the respective amount of Yb in the divalent state is such that any indirect and direct losses of Yb in the divalent state are exceeded by the gain attributable to Yb in the trivalent state.

BRIEF DESCRIPTION OF THE DRAWINGS

The invention will now be described with reference to the drawings wherein.

DETAILED DESCRIPTION OF THE INVENTION

Figure 1:
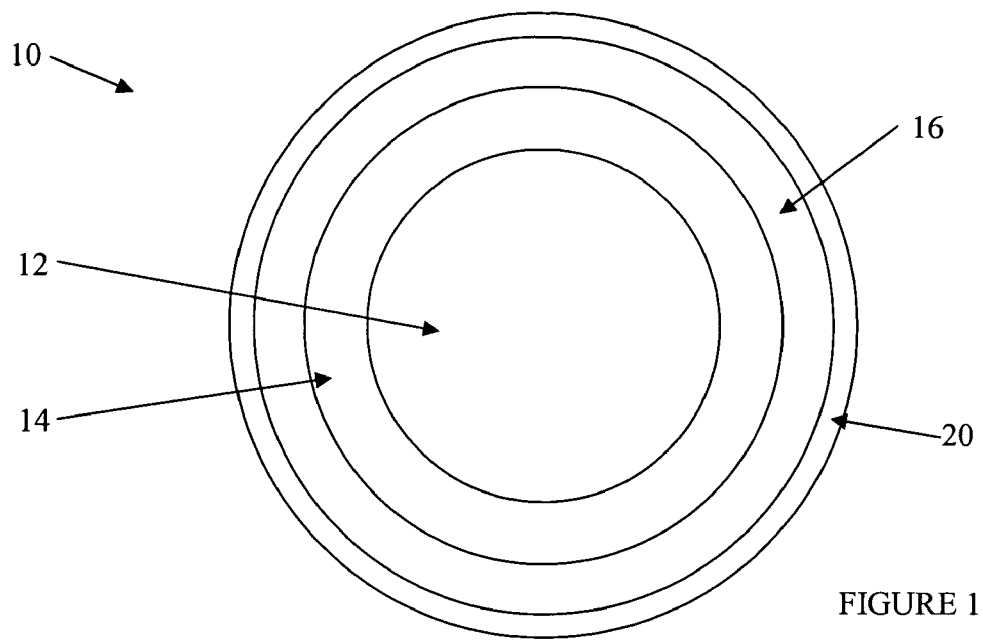
FIG. 1 of the drawings is a cross-sectional representation of a first waveguide configuration of the present invention.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
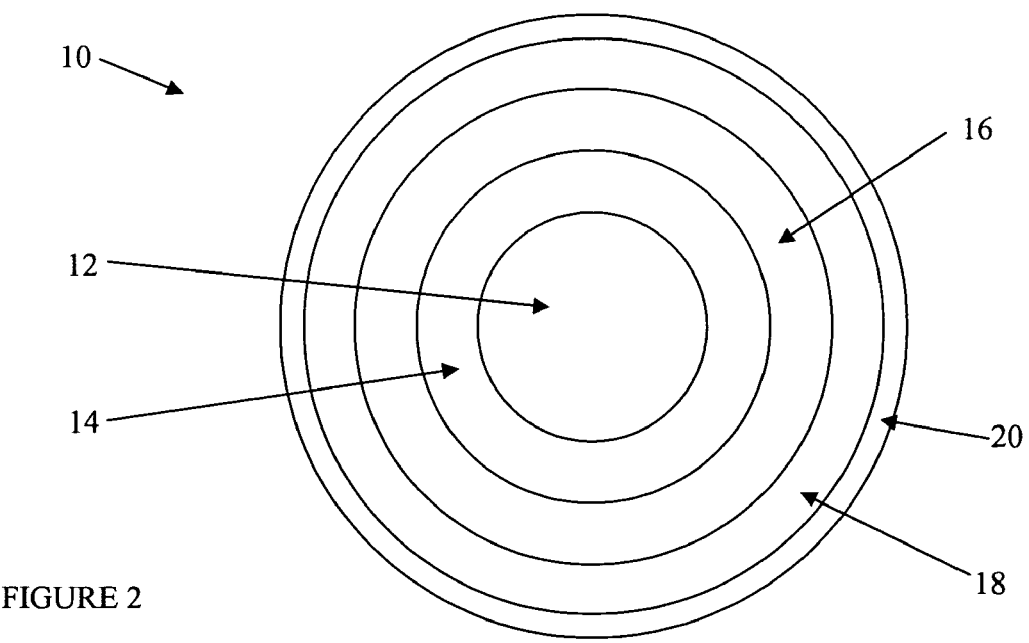
FIG. 2 of the drawings is a cross-sectional representation of a second waveguide configuration of the present invention.

Referring now to the drawings and in particular to FIG. 1, a waveguide configuration made in accordance with the present invention is shown generally as 10. Waveguide 10 includes core 12, a first cladding 14, a second cladding 16 and a buffer 20. In some applications, there may be a third cladding 18 as illustrated in FIG. 2. While the various layers are shown to have substantially uniform thicknesses, it will be understood that the particular thickness of any layer can be varied within the scope of the present invention. In addition, it is contemplated that the waveguide may comprise a substantially uniform cross-section along the length thereof. Among other cross-sectional configurations, circular cross-sectional configurations, are contemplated, as are oval shaped cores or cladding (i.e., for use with optical waveguides that preserve polarization).

Core 12 is shown in FIG. 1 as comprising a first material having an index of refraction $n_{core}$ and a certain shear velocity $v_{core}$. First cladding 14 extends around the core and is defined by an index of refraction $n_{clad1}$ and a certain shear velocity $v_{clad1}$. The shear velocity of the first cladding is less than that of the core (i.e., $v_{clad1} < v_{core}$). Similarly, the index of refraction of the first cladding is less than that of the core (i.e., $n_{core} > n_{clad1}$).

Second cladding 16 extends around the first cladding and is defined by an index of refraction $n_{clad2}$ and a shear velocity $v_{clad2}$. The shear velocity of the second cladding is greater than the shear velocity of the first cladding. In certain embodiments, the overall optical mode has an index of refraction greater than that of the second cladding.

Buffer 20 extends around the second cladding and, as will be understood by those of skill in the art, imparts tensile strength and a certain flexibility to the fiber. Typical buffers of the type commonly used in connection with waveguides are contemplated for use.

In certain applications, such as telecommunications, the above-described waveguide is suitable for use. However, and as is shown in the embodiment of FIG. 2, in association with lasers, an additional, third cladding 18 is positioned between second cladding 16 and buffer 20. Third cladding 18 includes an index of refraction $n_{clad3}$ which is less than the index of refraction of first cladding 14, second cladding 16 and core 12. In some cases, the buffer and third-cladding layer may be replaced by a low-index polymer material. However, the relative concentrations in laser fiber must render the index of the first cladding 14 greater than or equal to the second cladding 16.

Figure 3:
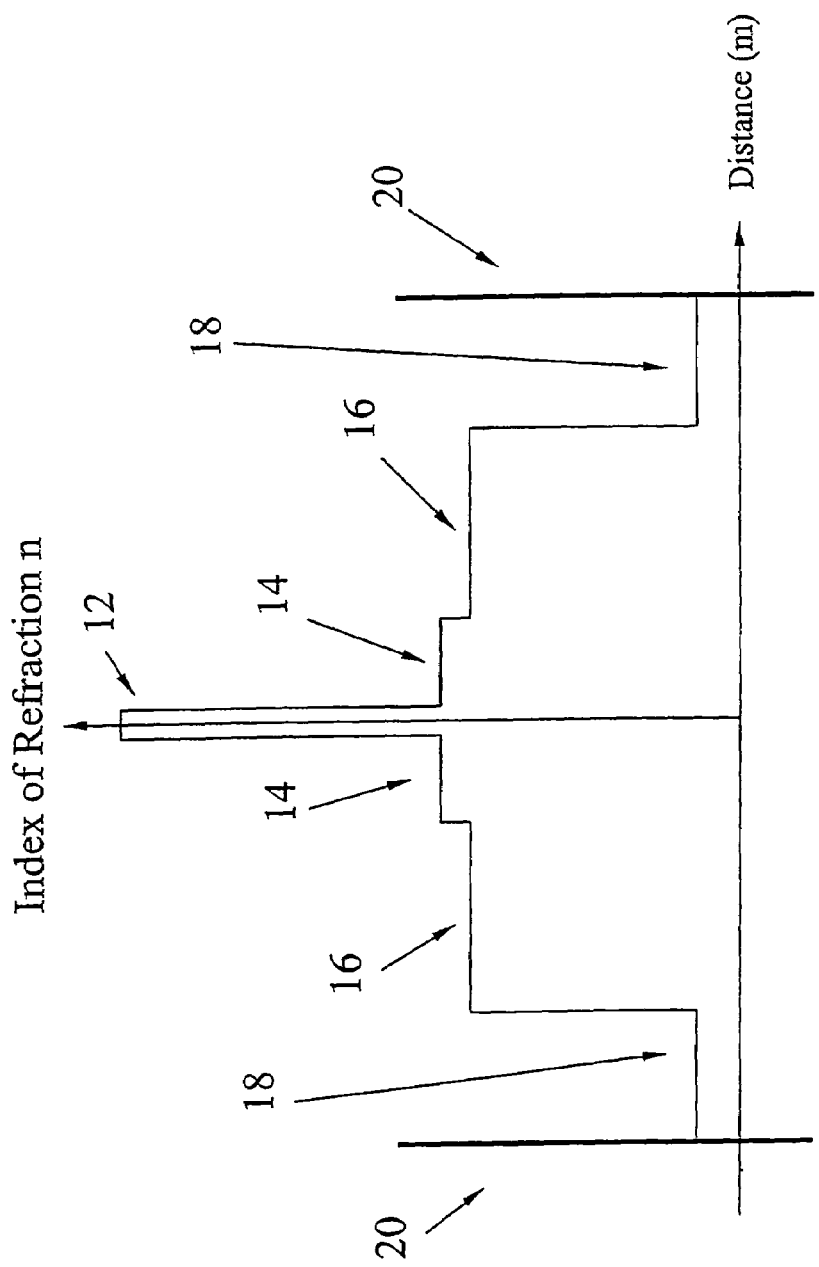
FIG. 3 of the drawings is a cross-sectional profile of the index of refraction of the waveguide configuration of the present invention shown in FIG. 2.
Figure 4:
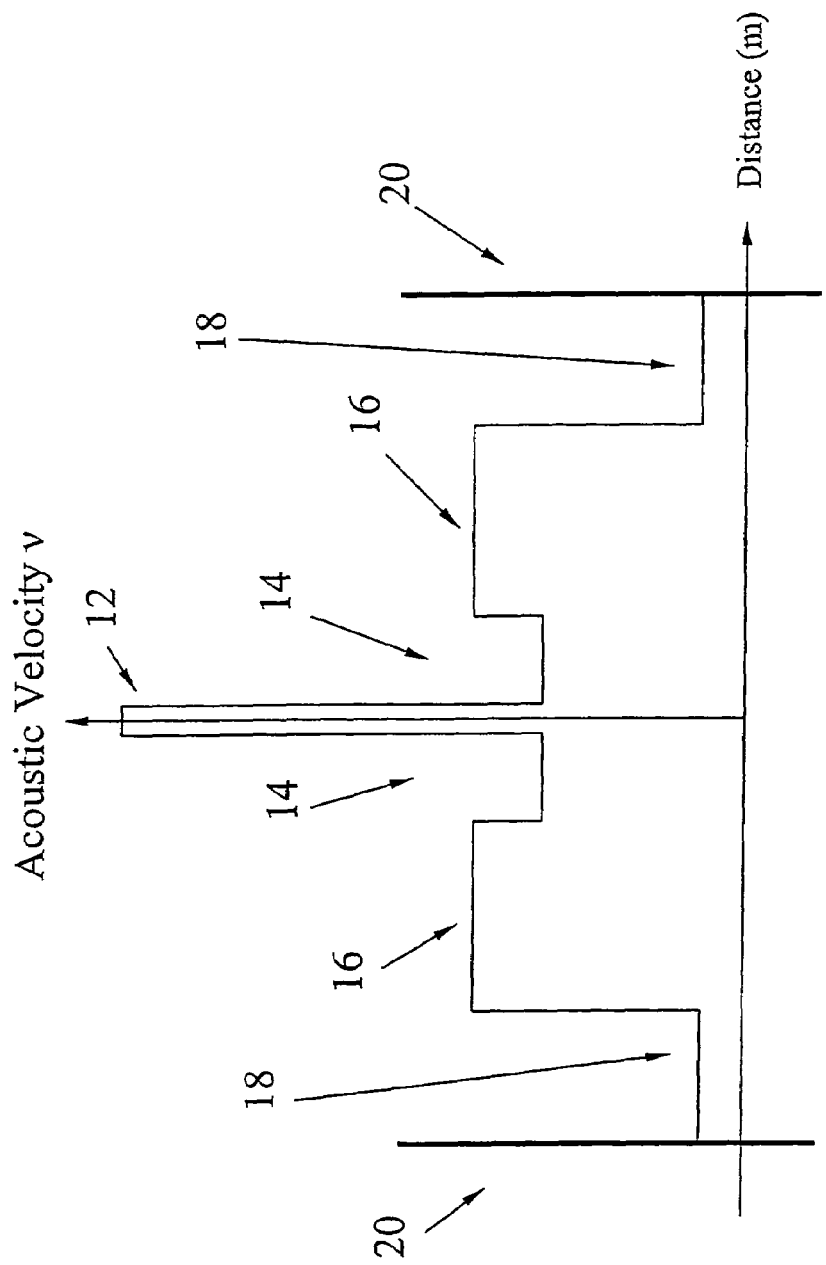
FIG. 4 of the drawings is a cross-sectional profile of the acoustic velocity of the waveguide configuration of the present invention shown in FIG. 2.

FIG. 3 of the drawings is a cross-sectional profile of the index of refraction of the waveguide configuration of the present invention shown in FIG. 2. Similarly, FIG. 4 of the drawings is a cross-sectional profile of the acoustic velocity of the waveguide configuration of the present invention shown in FIG. 2. It will be understood that the waveguide configuration of FIG. 1 has a similar cross-sectional profile relative to the acoustic velocity and the index of refraction, without cladding 18.

In operation, acoustic waves are constantly radiating from the core, whether the core is acoustically guiding or not. This is the fundamental difference between the optical and acoustic modes and is a result of the fact that the glass is a compressible fluid. The boundary between the first and second cladding results in a phenomenon substantially analogous to the total internal reflection of optical waves in the core. Thus, the first cladding substantially captures these waves, resulting in acoustic guidance. These waves are then re-transmitted into the core, interfering with the acoustic waves involved in the SBS process. This may also result in increased acoustic mode coupling into the first cladding layer. These processes then give rise to a degraded overlap between the optical and acoustic fields, leading to an increase in the threshold intensity for the onset of SBS.

It is desirable to form the foregoing waveguide with a core comprising a codoped Aluminum and Ytterbium. In such waveguides, it is desirable to have the Yb present within the waveguide as trivalent Yb. However, codoping of Aluminum and Ytterbium generally yields under commonly known processes YbAl clusters during formation which precipitate in the form of divalent Yb. The presence of divalent Yb within the waveguide can lead to many negative effects. For example, the resulting waveguide often exhibits erratic and undesirable behavior. For example, the waveguide often exhibits absorption of light at undesirable wavelengths (due to the presence of divalent Yb). Furthermore, through a series of reactions in the presence of intense light and heat, divalent Yb within a waveguide can, with the aid of other Yb and Al within a waveguide, result in the breaking of bonds in the glass. In turn, the waveguide becomes opaque and unusable. The greater the concentration of divalent Yb, the greater the problems that appear to be available. It will be understood that as the losses from the divalent Yb, and the negative effects thereof (i.e., photodarkening, among others), exceed the gain from the trivalent Yb (in the case of a laser amplifier), the waveguide may become useless. It will be understood that if the losses of the Yb (direct and indirect through, for example, photodarkening) can be controlled, the gains from trivalent Yb exceed such losses. If properly controlled, the gain should exceed the loss by a factor of at least two, and more preferably a factor of 6 or greater.

To minimize the formation of divalent Yb (i.e., to have substantially only trivalent Yb) it is necessary to control the precise quantities of Al and Yb that are introduced into the waveguide, to preclude the formation of clustering. One manner in which to mitigate YbAl clustering is to introduce a mitigating material, such as Boron, Fluorine, Germanium and/or Phosphorous. In such an embodiment, the Al concentration of a desired waveguide can be lowered by replacing some of the Al with Ge or P. If necessary, the index of refraction can be readjusted with the inclusion of B and F. In each such instance the quantity of Al and Yb can be controlled to substantially preclude the formation of YbAl clusters, and, in turn, the formation of divalent Yb. Another manner in which to control the formation of Al Yb clusters is through the precise control of the quantity of Al dissolved into a waveguide and the quantity of Yb dissolved into the Al within the waveguide. While the foregoing may not fully eliminate divalent Yb within a waveguide, in a substantially divalent Yb free waveguide (i.e., wherein the Yb within the waveguide is substantially entirely trivalent Yb), the negative and undesirable problems associated with Al Yb codoped waveguides can be eliminated.

It will be understood that the foregoing process can be utilized with other waveguides, such as waveguides that are designed for other purposes than to minimize SBS effects. Such waveguides may comprise telecommunication fibers and/or laser fibers which include codoped Al and Yb.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A waveguide configuration comprising:
    a core having an index of refraction and a shear velocity, the core being doped with Al, Yb, wherein the respective amount Yb in the divalent state is such that any indirect and direct losses of Yb in the divalent state are exceeded by the gain attributable to Yb in the trivalent state;
    a first cladding extending about the core having a shear velocity which is less than that of the core and an index of refraction which is less than the core;
    a second cladding extending about the first cladding, the second cladding having a shear velocity which is greater than that of the first cladding, wherein an optical mode has an index of refraction greater than that of the second cladding;
    third cladding extending about the second cladding, the third cladding having an index of refraction less than that of each of the core, first cladding and second cladding; and
    a buffer extending about the third cladding.

2. The waveguide configuration of claim 1 wherein the core includes at least one mitigating agent in place of at least some Al.

3. The waveguide configuration of claim 2 wherein the mitigating agent comprises at least one of the group selected consisting of: Boron, Fluorine, Phosphorous, and Germanium.

4. The waveguide configuration of claim 1 wherein the indirect and direct losses of Yb in the divalent state are exceeded by the gain attributable to Yb in the trivalent state by a factor of at least two.

5. The waveguide configuration of claim 4 wherein the factor of at least two comprises a factor of at least six.

6. The waveguide configuration of claim 1 wherein the core is substantially free of divalent Yb.

7. A waveguide configuration comprising:
    a core including Al and Yb, the respective amount Yb in the divalent state is such that any indirect and direct losses of Yb in the divalent state are exceeded by the gain attributable to Yb in the trivalent state;
    at least one cladding extending about the core; and
    a buffer extending about the outermost of the at least one cladding.

8. The waveguide configuration of claim 7 wherein the core includes at least one mitigating agent in place of at least some Al.

9. The waveguide configuration of claim 7 wherein the mitigating agent comprises at least one of the group consisting of: Boron, Fluorine, Phosphorous and Germanium.

10. The waveguide configuration of claim 7 wherein the at least one cladding comprises a first cladding and a second cladding.

11. The waveguide configuration of claim 7 wherein the Yb within the core is substantially entirely trivalent Yb.

* * * * *